United States Patent [19]
Baum et al.

[11] 3,744,106
[45] July 10, 1973

[54] APPARATUS FOR STRETCHING PLASTIC SHEET MATERIAL

[75] Inventors: Sidney J. Baum, Encino; Anton J. Mayr, Canoga Park, both of Calif.

[73] Assignee: Foster Grant Co. Inc., Leominister, Mass.

[22] Filed: Nov. 23, 1971

[21] Appl. No.: 201,337

[52] U.S. Cl............................ 26/54, 425/445, 26/68
[51] Int. Cl.............................................. D06c 3/06
[58] Field of Search............... 18/1 FS, 10, DIG. 53; 26/63, 68, 54; 264/288; 425/445

[56] References Cited
UNITED STATES PATENTS

| | | | |
|---|---|---|---|
| 2,547,763 | 4/1951 | Land et al. | 18/DIG. 53 |
| 3,243,844 | 4/1966 | Nash | 18/1 FS |
| 2,177,661 | 10/1939 | Kimble | 264/288 X |
| 2,854,697 | 10/1958 | Ryan | 264/288 |
| 3,201,826 | 8/1965 | Bruckner | 264/288 UX |
| 3,208,100 | 9/1965 | Nash | 18/1 FS |

FOREIGN PATENTS OR APPLICATIONS

| | | | |
|---|---|---|---|
| 866,674 | 3/1971 | Canada | 18/1 FS |

Primary Examiner—Robert L. Spicer, Jr.
Attorney—Francis C. Browne, James L. Bean et al.

[57] ABSTRACT

An apparatus for longitudinally stretching a continuous web of extensible material such as thermoplastic sheeting to produce a highly uniform stretch oriented film for use in the production of high quality optical elements. The web is stretched by applying a tensile stress to a length of the film moving between a pair of driven pinch-type restraining rolls and one or more pulling rolls driven at a rate greater than that of the restraining rolls to impart the desired degree of elongation. Softening heat is applied to the top surface of the film as the film emerges from the nip of the restraining rolls.

9 Claims, 5 Drawing Figures

APPARATUS FOR STRETCHING PLASTIC SHEET MATERIAL

BACKGROUND OF THE INVENTION

1. Field of the Invention

This invention relates to an apparatus for continuously uniaxially stretching films of extensible thermoplastic material, and more particularly to such an apparatus capable of producing an improved, highly uniform, stretch oriented film for use in high quality optical elements including polarizers, filters and optical lenses.

2. Description of the Prior Art

The uniaxial stretching of thermoplastic films to modify the physical and optical properties is well known, and numerous devices have been developed for the uniaxial stretch orientation of such film. In the use of these prior art devices, film which has been extruded or otherwise formed in a conventional manner is typically passed through a pair of restraining rolls which are driven at a fixed rate, then through a pair of pulling rolls driven at an increased rate to impart the necessary degree of axial stretch. Alternatively, a singe roll may be substituted for one or both pair of rolls, with the film being wrapped partially around the single roll under tension. Heat is applied to the film prior to or during the stretching operation, with the stretched film then being cooled and wound onto a roll or otherwise disposed of. U.S. Pat. No. 2,547,736 discloses one such apparatus in which the film to be stretched is passed successively between first and second sets of pinch rolls, with the softening heat being applied to the film between the two sets of rolls. By driving the second set of rolls at a substantially greater speed than the first, the film is stretched longitudinally of itself.

As is clearly pointed out in the prior patents, film stretched in the known prior art devices has not been entirely satisfactory for various reasons. For example, it has had a tendency to neck down (be reduced in the width dimension) excessively and the stretched film has not been of uniform quality, particularly near the edges, resulting in excessive waste for certain uses of the film. Attempts to overcome the defects of the prior art, and particularly the serious problems of neck down and edge waste due to uneven thickness of the stretched film near its edge have included, for example: moving the pulling and restraining rolls into closely spaced relation (U.S. Pat. No. 2,547,763); increasing the stretch rate by rapidly heating only a very narrow transverse band of the film at a position between the pulling and restraining rolls (U.S. Pat. No. 2,854,697); wrapping the film in an S-configuration around a pulling roll and a heated restraining roll positioned in close juxtaposition to the pulling roll (U.S. Pat. No. 3,214,503); and heating only the central portion of the film while leaving the edges unheated during the stretching operations (U.S. Pat. No. 2,804,652); and has also included heating both the top and bottom surfaces of the film and the use of various heat-applying devices such as hot air, electric resistance heaters, heated rolls, or a combination of these devices.

Attempts to produce a uniform high quality oriented film with a minimum of lost film width resulting from neck down and edge waste by use of the various methods and devices proposed in the prior art patents have not proven satisfactory. For example, attempting to apply the softening heat both above and below the film by use of electric resistance heating rods proved unsatisfactory, not only because of excessive neck down and edge waste, but also because of uneven and undesirable convection currents around and near the rod, particularly below the film which produced uneven heating resulting in undesired variations in the molecular orientation of the film. Similarly, attempts to apply the heat by directing hot air into the nip of the restraining rolls as the film is drawn therefrom resulted in random variations in the oriented film across the width thereof and excessive film loss due both to relatively high neck down and to edge waste. The use of a small-diameter electric resistance heating rod (3/16 inch diameter Chromalox heater rod) to heat only a narrow band of the film located randomly between the pulling and restraining rolls resulted in excessive neck down and edge waste. Also, stretch surging occurred, apparently as a result of the relatively intense heat which was required to produce the necessary softening of the plastic in the narrow heat zone produced by the small diameter heating rod. The intense heat produced minor variations in stretching rates (stretch surges) due to small unavoidable irregularities in the thickness and/or uniformity of the unstretched film.

Stretch surges are also caused by non-uniform convection currents. The higher the temperature of the heat source exposed to air, the greater the convection currents. Stretch surges produce lateral bands of differing molecular orientation, which bands are generally invisible to the naked eye, but are visible under a polariscope and lead to optical non-uniformity in the final polarized product, rendering it unsatisfactory for high quality optical elements.

One improved method of and apparatus for uniaxially stretch orienting plastic film is illustrated in our copending U.S. Pat. application Ser. No. 71,648, filed Sept. 14, 1970. This copending application is directed primarily to the elimination of excessive neck down and edge waste and involves the concept of applying the softening heat to the film by passing the film through the nip of the pair of restraining rolls, one or both of which are heated so that the film is uniformly heated to the stretching temperature when it emerges from the nip of the rolls. The film is drawn from the restraining rolls by any suitable pulling rolls in a direction substantially tangent to both restraining rolls as the film leaves the nip so that the film is not stretched or elongated to any substantial extent while the film is in contact with a heated surface. Although film elongated in accordance with the teachings of our prior application not only produces a previously unattainable ratio of usable film to original film width, but also produces a film of exceptionally high uniformity, which is highly suitable for most commercial uses, it has been found that such film may contain imperfections invisible to the naked eye which, nevertheless, render the film objectionable for certain high quality optical elements. These slight imperfections are believed to come from moisture contained in the film prior to stretching and to lateral molecular slippage, and may also result from the inability to obtain perfectly uniform, smooth and compatible rolls, on a commercial basis, for use as heated restraining rolls. Any imperfection in the restraining rolls is manifested in imperfections in the treated film. And, of course, it is impossible to avoid some slight degree of film elongation while the heated film is still in contact with the roll surfaces at the nip.

SUMMARY OF THE INVENTION

The present invention contemplates the uniaxial stretch orientation of thermoplastic films by passing the film between the nip of a pair of driven pinch type restraining rolls, at least one of which is preferably internally cooled by circulating a liquid coolant therethrough. The restraining rolls are pressed together under substantial force to prevent slippage of the film therebetween, and the film is elongated by one or more driven pulling rolls which supply the tensile force to stretch the film. The softening heat is applied to the film as the film emerges from the nip of the restraining rolls with the heat being applied as close as practical to the nip line. This may be accomplished by a heated metal bar (hereinafter, hot bar) positioned closely adjacent to the surface of the film and as close as practical to the nip line. The size and configuration of the hot bar is such as to permit it to be mounted closely adjacent the nip line without contacting the adjacent restraining roll or the film.

By using a single hot bar positioned adjacent to the film, a clearly defined, uniform, transverse heating band is provided across the film. By maintaining the distances from the hot bar to the film and from the hot bar to the restraining roll nip at a practical operating minimum, it has been found that the total loss of the original film width due to neck down and edge waste is substantially less than that obtainable by the methods of any of the prior art patents mentioned above, and only slightly greater than that attainable by the method and apparatus described in our above-identified co-pending application. Further, since the restraining rolls employed in the present invention are cooled, any slight imperfections in these rolls will not adversely affect the film passing therethrough so that the usable portion of the stretch oriented film processed in accordance with the instant invention is of a highly uniform quality.

The uniform quality of the film processed in accordance with the present invention may be further increased by the use of a hot bar which is relatively wide in the direction of film movement and having a generally flattened surface positioned closely adjacent to the film. This configuration permits the use of a less intense heat, with the result that the film is subjected to a more uniform and gradual temperature increase as it passes from the nip of the restraining rolls to the point where the stretching commences. This relatively wide heating zone permits the stretch line (i.e., the transverse line where stretching commences) to seek its optimum location for a particular film and thus effectively eliminates stretch surging and the accompanying lateral bands which adversely affect the optical uniformity of the oriented film.

The hot bar preferably has a relatively thin profile along its edge portion near the restraining roll nip to enable the bar to be inserted between the two rolls to a point very close to the nip. Also, the generally flattened surface of the hot bar positioned closely adjacent the surface of the film makes it possible for the film to absorb the necessary heat without requiring the temperature of the hot bar to be excessively high. It has also been found that, by tilting the hot bar so that the generally flattened surface is inclined slightly with respect to the film, with the edge of the flattened surface farthest from the restraining roll nip being closest to the film surface, the hot bar cooperates with the adjacent restraining roll and the film surface to form an effective shield which minimizes convection currents in the area of the heating band.

BRIEF DESCRIPTION OF THE DRAWINGS

The foregoing and other advantages of the invention will become apparent from the following detailed description taken in conjunction with the drawings, in which.

DESCRIPTION OF THE PREFERRED EMBODIMENTS

This invention is applicable to the processing of essentially any synthetic polymer or polymer derived from naturally occurring substances, which can be cast or extruded or otherwise processed into a continuous length of film or sheet and which can be subsequently stretched or stretch oriented. However, the invention is particularly useful for processing such of those materials as are capable of molecular orientation by the stretching process whereby the material is rendered particularly well adapted for the production of optical elements such as polarizers, filters, optical lenses, or the like. Since oriented polyvinyl alcohol and partially hydrolyzed polyvinyl acetate films are particularly useful in the production of optical lenses and polarizers, these materials may be specifically referred to hereinafter in the explanation of this invention, it being understood that the invention is not limited to use in the processing of these materials.

Figure 1:
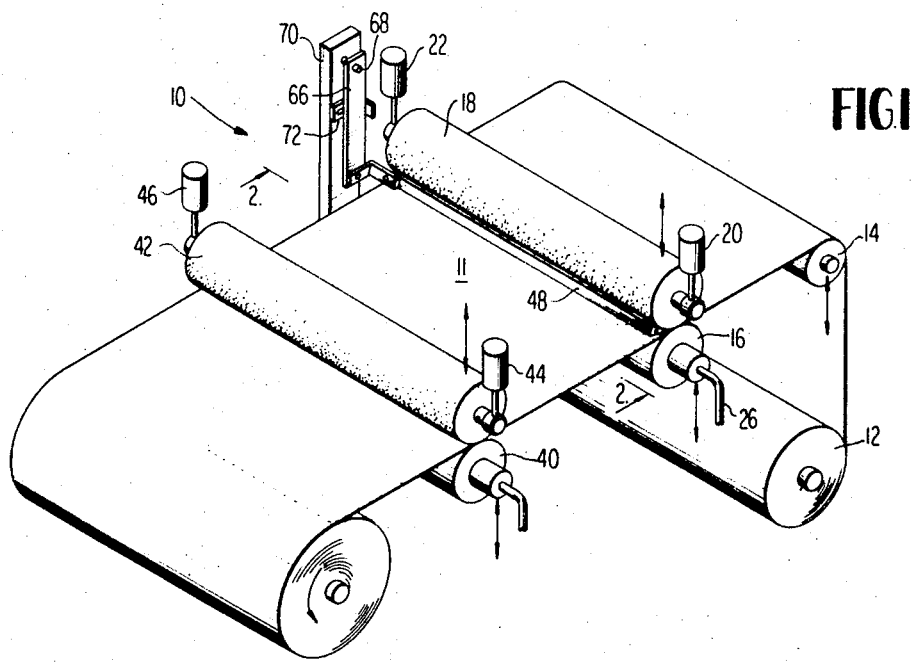
FIG. 1 is a schematic perspective view of a portion of an apparatus embodying the present invention.

Referring specifically to the drawings, an apparatus capable of performing the invention is illustrated schematically in FIG. 1 and indicated generally by the reference numeral 10. A supply of cast, dried film 11 is fed from a suitable source such as a stock roll 12 over a vertically adjustable idler roll 14, then through the nip of a pair of restraining rolls 16, 18 which are resiliently pressed together by a suitable means such as a pair of fluid pistons 20, 22. The bottom restraining roll 16 is preferably a hollow core roll having its outer surface chrome plated and polished to a smooth finish. Cooling fluid may be circulated through the hollow center 24 of roll 16 through inlet 26 and outlet 28 to maintain the surface of the roll at the desired temperature. Restraining roll 18 preferably has its outer surface covered with a layer 30 of relatively firm resilient material such as a silicone rubber which is capable of yielding slightly under pressure from the fluid pistons 20, 22 to normally provide contact with the surface of roll 16 along a relatively narrow band. Rolls 16, 18 may advantageously have a diameter of about 4 inches when the apparatus is employed to process polyvinyl alcohol film having a thickness of about 2 mils.

Restraining roll 18 may also be hollow and can be cooled, if necessary, by circulating a cooling fluid such as water through the hollow central portion 32 thereof from inlet 34 to outlet 36. Since the film 11 is relatively thin and normally on the order of about 2 mils, the roll 18 will normally be adequately cooled by contact with the film which, in turn, is in pressure contact with the cooled surface of roll 16. However, under certain conditions, such as the processing of heavier gauged films, it may be desirable to cool both rolls.

From the restraining rolls 16, 18, the film 11 passes through a pair of pulling rolls 40, 42 spaced at any convenient distance from the restraining rolls 16, 18. Roll 40 may be identical to roll 16, and roll 42 may be identical to roll 18, with provisions being made to circulate cooling fluid through one or both of the rolls to quench the stretched film, when desired. A second set of fluid pistons 44, 46 are provided to press roll 40 into contact with roll 42 to provide the necessary friction between the surface of the rolls and the film to prevent slipping on the surface of the rolls. Suitable drive means such as sprockets 47 mounted on one end of roll 16 and a similar sprocket, not shown, mounted on roll 40 are provided to drive the restraining and pulling roll sets. Preferably, rolls 18 and 42 are not driven except by frictional contact with rolls 16 and 40, respectively, and with the film being processed. The pulling roll 40 is driven at a rate substantially greater than the rate of the restraining rolls 16, and conventional differential drive means, not shown, may be provided to vary this rate difference in order to provide a variable degree of stretch of the film between restraining rolls 16, 18 and the pulling rolls 40, 42.

Figure 3:
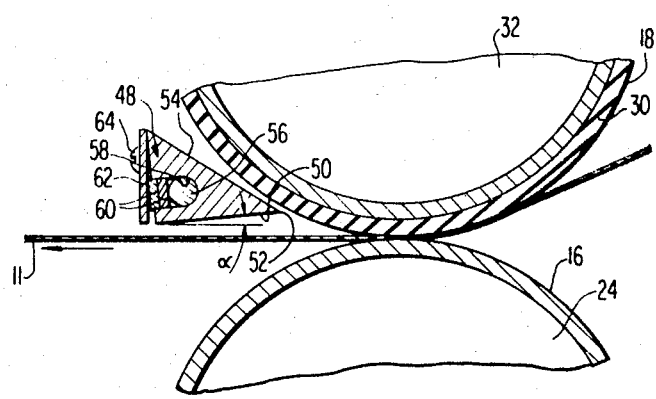
FIG. 3 is a further enlarged, fragmentary sectional view taken on line 3—3 of FIG. 2.
Figure 4:
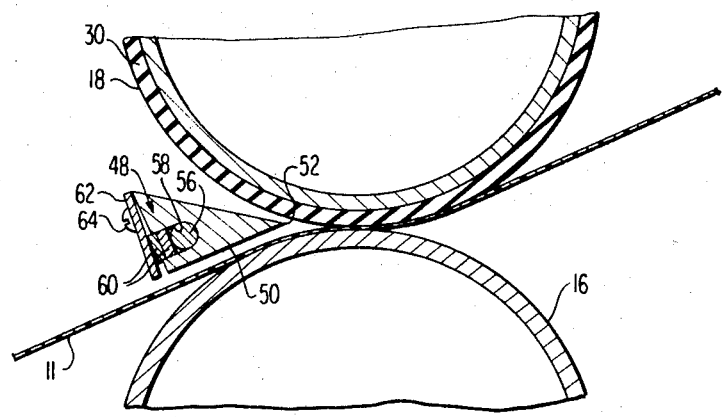
FIG. 4 is a view similar to FIG. 3 and showing an alternate embodiment of the invention.

The heat necessary to soften the film before stretch orienting is applied by positioning a hot bar 48 closely adjacent the top surface of the film 11 as the film emerges from the nip of the restraining rolls 16, 18. As best seen in FIGS. 3 and 4, hot bar 48 is preferably of a generally triangular shape having a substantially flat, relatively wide bottom surface 50 spaced closely adjacent to and inclined at a slight angle $\alpha$ (FIGS. 3 and 4) with respect to the top surface of the film 11. The toe 52 of the triangular hot bar 48 is inserted beneath the projecting portion of roll 18 until the top, inclined surface 54 of the triangle is positioned very close to the outer surface of roll 18, shielding the heating zone and thus minimizing the flow of heated air upward around the toe 52. Hot bar 48 is heated by an electric resistance heating element 56 positioned within a generally U-shaped groove 58 and retained therein by a pair of spacer bars 60 which, in turn, are retained within groove 58 by mounting brackets 62 and screws 64. Any minor variations in temperature along the length of heating elements 56 are compensated for by the relatively larger mass of the bar 48.

The mounting brackets 62 are supported on the free end of a pair of pivoted support arms 66, one at each end thereof, which arms have their pivoted ends supported by pins 68 on the upstanding posts 70 constituting a portion of the frame of the apparatus 10. Adjustable stop brackets 72 mounted on the posts 70 limit pivotal movement of the arms 66 to thereby limit the extent of movement of the hot bar 48 into the nip of the restraining rolls. At the same time, the pivotal mounting of the hot bar permits it to be readily removed from the vicinity of the restraining nip whenever necessary or desired.

As indicated in the modification of the invention illustrated in FIG. 4, the hot bar 48 may be inserted between the rolls 16, 18 to a position slightly closer to the nip by varying the elevation of the restraining rolls with respect to the pulling rolls so that the film 11 emerges from the restraining roll nip at a slight downwardly inclined angle. To facilitate this, the bearings 74, 76 supporting the opposed ends of the restraining rolls 16, and the bearings 78, 80 supporting corresponding ends of the restraining roll 18, are mounted within vertically extending slots 82 in the respective posts 70 to permit their vertical adjustment. It is important, however, that the downward angle of the film 38 not be sufficient to maintain the film in contact with the surface of restraining roll 16 to a point beyond which substantial softening of the film has taken place since stretching the film in contact with the bottom roll surface will produce irregularities in the film and may result in excessive film breakage. This downward angle would necessarily be quite small when processing very thin film due to the fact that heat which is applied to the film would be absorbed by the roll in the area where the film is in contact with the cool surface. Thus, under certain conditions, the net effect of moving the film downward to permit the hot bar to be moved closer to the nip may be to narrow the heating band and move it farther from the nip, with a consequent loss in quality and/or quantity of processed film.

The generally triangular configuration of the hot bar 48 serves a dual function in that it permits the tapered toe portion at 52 to be inserted between the film and the upper restraining roll to a point very close to the nip and also facilitates the application of a heat gradient from the forward or toe portion of the hot bar to the rear or heel portion thereof. The heat gradient results from the variations in the mass of the hot bar and the consequent variations in its ability to absorb and retain the heat from the heating element 56. To facilitate this heat absorption, the hot bar 48 is preferably formed from a material such as copper or the like which is a good heat conductor.

It has been found that convection currents in the air around the hot bar can be greatly reduced by inclining the generally flat bottom surface 50 of the hot bar 48 at a slight angle $\alpha$ with respect to the top surface of the film 38, and by positioning the top surface 54 as close as practical to the surface of roll 18 to form, in effect, a labyrinth-type seal therebetween. By positioning the heel of the hot bar close to the top of the surface of the film, a relatively stable mass of heated air becomes trapped beneath the hot bar which, together with the angled surface 50, tends to direct heat into the nip of the rolls. This results in a more gradual, uniform application of heat to the film throughout the heating zone from the nip of the restraining rolls to the heel of the hot bar with a consequent substantial improvement in the uniformity of the stretched film. An angle $\alpha$ of approximately 5° has been found to be very effective in minimizing the convection currents.

While the bottom surface 50 of hot bar 48 is referred to as being relatively wide, it should be pointed out that this term is used in contrast to the commercially available resistance heating elements, or rods, such as the 3/16 inch diameter heating rod manufactured by and sold under the trademark Chromalox. Marked reductions in lateral bands of irregular molecular orientation resulting from stretch surges may be obtained with a hot bar having a generally flattened surface adjacent the film which is within the range of ⅝ to 1¼ inches in width. An excessively wide heating zone will result in a material increase in neck down and edge waste and the preferred width of the flattened surface for stretching polyvinyl alcohol film is within the range of ¾ to 1⅛ inches.

The location of the hot bar with respect to the restraining roll nip is also important. Preferably, the hot bar is positioned as close to the nip as practical without danger of contacting the surface of the adjacent restraining roll and while maintaining the minimum clearance relative to the film to prevent burning the film. To avoid excessive neck down and edge waste, the hot bar must be located as close to the nip as practical, and preferably with at least a substantial portion of the heating band located between the two restraining rolls, i.e., between the nip line and a plane which is generally perpendicular to the film and tangent to the two restraining rolls.

Figure 2:
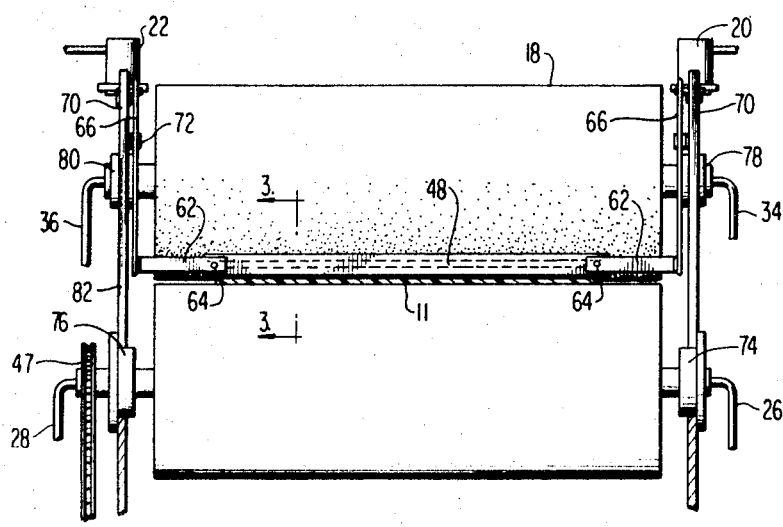
FIG. 2 is an enlarged sectional view taken on line 2—2 of FIG. 1.

There are, of course, several factors which place a practical limit on how close to the nip the hot bar can be positioned. These factors include the diameter of the top restraining roll, the geometrical configuration of the hot bar, the clearance between the film and the hot bar and between the hot bar and the top roll, the angular deflection of the bottom, generally flat, surface of the hot bar, and the extent of roll depression when the lower roll is pressed into the rubber surface of the top roll. Obviously, the smaller the diameter of the top roll, the closer the hot bar can be placed to the nip line. For example, assuming that a hot bar having a cross section as illustrated in FIGS. 1–3 with the surface 50 being 1 inch wide and having a height at the heel of three-quarter inches, is positioned so that the heel is 0.1 inch from the film and that the surface 50 is positioned at an angle of 5° with respect to the film, the minimum distance from the center line of the nip to the toe will vary with the top restraining role diameter approximately as follows:

| Top roll diameter | Approx. minimum distance to toe |
|---|---|
| 2 inches | 0.600 inches |
| 3 " | 0.715 " |
| 4 " | 0.875 " |
| 6 " | 1.150 " |

Figure 5:
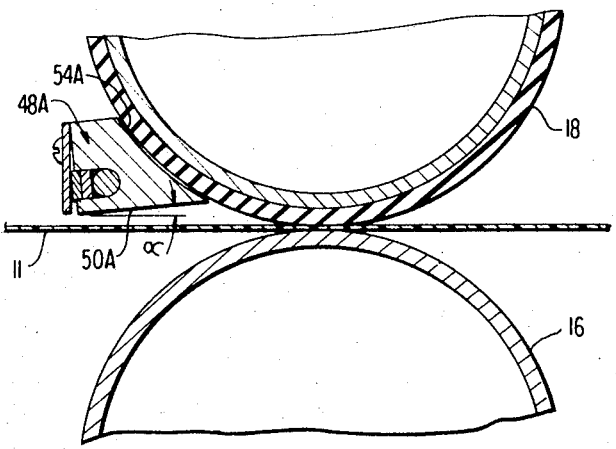
FIG. 5 is a view similar to FIG. 3 and showing a further embodiment of the invention.

The above minimum distances to the toe can be reduced slightly by altering the geometric configuration of the hot bar. For example, the configuration illustrated in FIG. 5 will permit this distance to be reduced from approximately 0.875 to approximately 0.82 inches for a 4-inch top roll. In this embodiment, the top surface 54A of the generally triangular hot bar 48A is concave and dimensioned to closely conform to the outer surface of the top roll 18. It is considered impractical, however, to reduce the distance from the nip to the toe to substantially less than one-half inch, even when using a restraining roll having a diameter less than two inches.

The above distances may also be substantially reduced by reducing the spacing between the heel portion of the hot bar and the top surface of the film. For most materials, it is desirable to maintain this spacing as low as possible, both to enable the minimum spacing between the hot bar and nip and to minimize the convection currents in the heating zone. However, the necessity of avoiding contact between the film and the hot bar, and of providing clearance to permit the hot bar to be freely pivoted into and out of position places certain minimum limitations on the spacing between the film and the hot bar. This minimum spacing has been found to be about 0.015 inches for the processing of 2 mil polyvinyl alcohol film.

In order to further illustrate the present invention, tests were conducted to compare the results of the method of this invention as performed on an apparatus illustrated in FIG. 1 with the results obtainable from available prior art devices. First, a film of polyvinyl alcohol 7.25 inches wide and 2 mils thick was processed on an apparatus of the type illustrated in U.S. Pat. No. 2,547,736, with the pulling rolls being driven at 4 times the rate of the restraining rolls to stretch the film 300 percent at a rate of 2 feet per minute. After stretching, the film width was reduced to 3.92 inches indicating a neck down of 46 percent. In order to obtain a fairly uniform stretch pattern acceptable for use in the production of commercial grade polarizers, filters, sunglasses, or the like, another 35 percent of the original width of the film had to be removed from the side edges so that the effective yield from the original film was approximately 20 percent. Although commercially acceptable for certain applications, the end product was not sufficiently uniform to be acceptable for the production of high quality optical elements.

By comparison, identical film was stretched in accordance with the method of this invention, on the apparatus illustrated in FIGS. 1–3. The hot bar was positioned 0.1 inch from the top surface of the film and horizontally located so that the toe of the bar was 0.9 inch from a vertical plane containing the axes of the restraining rolls. The film was stretched 380 percent at a speed of 2 feet per minute. The width of the stretched film was 6.1 inches for a total neck down of 16 percent. The film was stretched uniformly across substantially its entire width so that it was only necessary to trim 10 percent of the original width from the edges, resulting in an effective yield of 74 percent. While this effective yield is less than that obtainable by use of the invention described in our above-identified copending application, the film processed according to the present invention was found to be of a superior quality in that it was highly uniform and free from irregularities in the pattern of molecular orientation. Thus, where the end product is to be employed in the production of high quality precision optical elements, the small loss in total yield obtained from the practice of the present invention over that obtained from the method disclosed in that earlier application is more than compensated for.

In further tests conducted on identical film and under circumstances as nearly identical to those described above as could be maintained, but with the triangular shaped hot bar being replaced with a small diameter circular heating element (three-sixteenths Chromalox) results were obtained which, insofar as neck down and edge waste are concerned, were comparable to those obtained employing the triangular hot bar. However, when the processed film was examined under a polariscope, numerous lateral bands of irregular molecular orientation resulting from stretch surges became evident. Some of these lateral bands were sufficiently severe to be readily detectable in polarized optical elements produced from the processed film. Thus, while the product produced by the use of the relatively narrow, high-intensity band of heat close to the nip proved inferior to that obtainable by the use of the wide hot bar described above, this product was nevertheless substantially superior, both from the standpoint of quality and total yield, to that obtainable by the processes of the prior art.

Further testing has demonstrated that an increase in the height of the hot bar above the film surface results in an increase in neck down and edge waste. Similarly, tests were conducted to determine the effect of increasing the distance from the hot bar to the restraining roll nip while maintaining the height of the bar constant at 0.1 inch from the film. These tests demonstrated that the distance from the nip to the hot bar is an important factor in the overall process, with increases in this distance producing increases in neck down and edge waste. Also, excessive distance between the nip and hot bar was shown to result in decreased film quality.

Tests were also conducted to determine what, if any, effect the spacing of the pulling rolls' relation to the restraining rolls would have on the total yield or quality of the film processed according to the method of the present invention. These tests showed that, so long as the hot bar is maintained in close proximity to the restraining roll nip, the distance between the restraining and pulling rolls is of no significance, either from the standpoint of neck down and edge waste or film quality.

The close proximity of the hot bar to the top restraining roll results in this roll absorbing a substantial amount of heat during operation of the apparatus of the present invention. Failure to cool this roll may result in the heat level gradually building up to the point where the film is pre-softened in the restraining roll nip. This pre-softening can result in the optical imperfections which sometimes occur in the practice of the invention described in our copending application. It is also conceivable that continued operation of the apparatus without cooling the restraining rolls may result in the film being presoftened as it approaches the restraining rolls so that any back load in the film could produce a pre-stretching and neck down ahead of the restraining rolls.

While we have disclosed and described preferred embodiments of our invention, we wish it understood that we do not intend to be restricted solely thereto, but rather that we intend to include all embodiments thereof which would be apparent to one skilled in the art and which come within the spirit and scope of our invention.

We claim:

1. A system for uniaxially stretch orienting thermoplastic film comprising a frame, film restraining and feeding means including a pair of pinch rolls, means mounting said pinch rolls one above the other on said frame for rotation about spaced parallel axes and for relative movement toward and away from one another, means for urging said pinch rolls toward one another to apply pressure to a running length of film passing therebetween, means for driving at least one of said pinch rolls about its rotational axis, means for cooling at least one of said pinch rolls to dissipate heat therefrom, pulling roll means, bearing means mounting said pulling roll means on said frame in position to draw a running length of film from said pinch rolls in a generally horizontal direction, means for driving said pulling roll means at a rate greater than the rate at which said pinch rolls are driven to thereby apply a tensileforce to said running length of film between said pinch rolls and said pulling roll means, a heating zone extending transversely across said film, an elongated heating bar, heating means extending longitudinally through and confined within said heating bar at the heating zone for applying heat thereto, and means mounting said heating bar on said frame at said heating zone in a position extending transversely of and closely adjacent to one surface of said film as the film emerges from the nip of said restraining rolls, said mounting means positioning said heating bar closely adjacent said nip with at least a substantial portion of said heating bar disposed within the area between said nip and a plane extending transversely of said film and tangent to said pair of restraining rolls.

2. In a system for uniaxially stretch orienting thermoplastic film as defined in claim 1, the further improvement wherein said pair of pinch rolls comprises a first metal roll having a polished outer surface for contacting said film and a second roll having an outer coating of resilient material, said resilient material being deformable under influence of pressure from said means urging said pinch rolls toward one another whereby the length of film clamped between said pinch rolls in the nip thereof is increased.

3. In a system for uniaxially stretch orienting thermoplastic film as defined in claim 2, the further improvement wherein said pulling roll means comprises a pair of pinch rolls and means for urging said pinch rolls toward one another to apply pressure to the film passing therebetween.

4. A system for uniaxially stretch orienting thermoplastic film as defined in claim 1, the further improvement wherein said heating bar means comprises an elongated metal bar having a generally flattened surface, and wherein said mounting means supports said heating bar means with said generally flattened surface in closely spaced relation to the top surface of said film.

5. In a system for uniaxially stretch orienting thermoplastic film as defined in Claim 4, the further improvement wherein said heating bar comprises an elongated generally triangu-lar shaped metal bar, said generally flattened surface being one side surface of said triangular metal bar, and heating means ex-tending longitudinally through said elongated bar for supplying heat thereto.

6. In a system for uniaxially stretch orienting thermoplastic film as defined in Claim 5, the further improvement wherein said mounting means comprises means for mounting said elongated metal bar with one edge directed generally toward said nip and with said flattened surface being inclined at a slight angle relative to said top surface.

7. In a system for uniaxially stretch orienting thermoplastic film, including a frame supporting a pair of pinch rolls mounted one above the other for rotation about spaced parallel axes and for relative movement toward and away from one another, means for urging the pinch rolls toward one another to apply pressure to a running length of film passing therebetween, drive means for rotating at least one of the pinch rolls about its rotational axis, and driven pulling roll means mounted on the frame in position to draw a running length of film from the pinch rolls in a generally horizontal direction to thereby apply a tensile force and axially stretch the film between the pinch roll and the pulling roll means, the improvement comprising heating means defining a transverse heating band across said film between said pinch rolls and said pulling roll means and extending from the nip of said pulling rolls along the length of said film a predetermined distance with at least a major portion of said heating band being positioned between said nip line and a plane extending transversely of said film and tangent to said pinch rolls, said heating means including an elongated metal bar having a generally flattened surface, mounting means supporting said metal bar with said generally flattened surface in closely spaced relation to the top surface of said film, an opening formed in and extending longitudinally of said metal bar, and electrical resistance heating means mounted within said opening for heating said metal bar to thereby apply heat to said film uniformly across the width thereof within said heating band.

8. In the system as defined in claim 7, the further improvement including means for cooling one of said pinch rolls to dissipate heat therefrom.

9. In the system as defined in claim 7, the further improvement wherein said metal bar is generally triangular in cross section, and wherein said metal bar cooperates with said top film surface and the adjacent top restraining roll to shield said heating band against excessive air currents therein.

* * * * *